United States Patent
Wilson

(10) Patent No.: US 8,588,682 B2
(45) Date of Patent: Nov. 19, 2013

(54) NEAR FIELD RF COMMUNICATORS HAVING REFINED ENERGY SHARING CHARACTERISITICS UTILIZING IMPROVED SHUNT CURRENT CONTROL

(75) Inventor: Robin Wilson, Gloucestershire (GB)

(73) Assignee: Broadcom Innovision Limited, Cambridge (GB)

( * ) Notice: Subject to any disclaimer, the term of this patent is extended or adjusted under 35 U.S.C. 154(b) by 211 days.

(21) Appl. No.: 12/743,208

(22) PCT Filed: Nov. 14, 2008

(86) PCT No.: PCT/GB2008/003842
§ 371 (c)(1),
(2), (4) Date: Jul. 9, 2010

(87) PCT Pub. No.: WO2009/063214
PCT Pub. Date: May 22, 2009

(65) Prior Publication Data
US 2010/0291869 A1  Nov. 18, 2010

(30) Foreign Application Priority Data
Nov. 15, 2007  (GB) .................................. 0722516.2

(51) Int. Cl.
*H04B 5/00*  (2006.01)
(52) U.S. Cl.
USPC .......................................... 455/41.1; 323/267
(58) Field of Classification Search
USPC ................ 455/41.1, 41.3; 343/866, 867, 895; 340/572.1; 323/267
See application file for complete search history.

(56) References Cited

U.S. PATENT DOCUMENTS

| 5,045,770 | A  |    | 9/1991  | Brooks          |         |
|-----------|----|----|---------|-----------------|---------|
| 5,444,358 | A  |    | 8/1995  | Delepaut        |         |
| 6,134,130 | A  |    | 10/2000 | Connell et al.  |         |
| 6,201,374 | B1 | *  | 3/2001  | Ater et al.     | 323/267 |
| 7,347,379 | B2 | *  | 3/2008  | Ward et al.     | 235/492 |
| 7,576,657 | B2 | *  | 8/2009  | Duron et al.    | 340/572.7 |
| 7,773,695 | B2 | *  | 8/2010  | Zhou et al.     | 375/300 |
| 7,948,208 | B2 | *  | 5/2011  | Partovi et al.  | 320/108 |
| 2002/0070717 | A1 |  | 6/2002 | Pellegrino      |         |

FOREIGN PATENT DOCUMENTS

WO   WO-2006003460 A1   1/2006

OTHER PUBLICATIONS

PCT International Search Report and Written Opinion, PCT/GB2008/003842, mailing date Mar. 20. 2009.

* cited by examiner

*Primary Examiner* — Ping Hsieh
*Assistant Examiner* — Chung-Tien Yang
(74) *Attorney, Agent, or Firm* — Sterne, Kessler, Goldstein & Fox P.L.L.C.

(57) ABSTRACT

A near field RF communicator has an inductive coupler (223) to enable inductive coupling with a magnetic field of an RF signal; a rectifier (213,214,215,216) to rectify an AC voltage derived from an RF signal inductively coupled to the inductive coupler (223); and a regulator (209,210,211,220,221, 900) to regulate a voltage derived from an RF signal inductively coupled to the inductive coupler, the regulator having a voltage-controlled impedance (210, 211) and a regulator controller (209) to provide a control voltage for the voltage controlled impedance and to vary the control voltage in dependence upon a current flowing through the voltage controlled impedance (210, 211). To prevent the voltage regulator from drawing excess current and energy from an RF field in which the communicator is present the voltage regulator is controlled to provide a chosen impedance characteristic.

20 Claims, 5 Drawing Sheets

NEAR FIELD RF COMMUNICATORS HAVING REFINED ENERGY SHARING CHARACTERISITICS UTILIZING IMPROVED SHUNT CURRENT CONTROL

CROSS-REFERENCE TO RELATED APPLICATIONS

The present application is a U.S. national stage entry of International Application No. PCT/GB2008/003842, filed Nov. 14, 2008, titled "NEAR FIELD RF COMMUNICATORS," which claims priority to United Kingdom Application No. 0722516.2, filed Nov. 15, 2007.

This invention relates to near field RF communicators, near field communications enabled devices and regulators for near field RF communicators.

Near field RF (radio frequency) communication is becoming more and more commonplace as is the use of such technology to transfer data. Near field RF communicators communicate through the modulation of the magnetic field (H field) generated by a radio frequency antenna. Near field RF communication thus requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

NFC communicators are a type of near field RF communicator that is capable in an initiator mode of initiating a near field RF communication (through transmission or generation of an alternating magnetic field) with another near field RF communicator and is capable in a target mode of responding to initiation of a near field RF communication by another near field RF communicator. The term "near field RF communicator" includes not only NFC communicators but also initiator near field RF communicators such as RFID transceivers or readers that are capable of initiating a near field RF communication but not of responding to initiation of a near field RF communication by another near field RF communicator and target or responding near field RF communicators such as RFID transponders (sometimes known as tags) that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

There are several standards in existence which set out certain communication protocols and functional requirements for RFID and near field RF communications. Examples are ISO/IEC 14443, ISO 15693, ISO/IEC 18092 and ISO/IEC 21481.

NFC communicators may be comprised within a larger device, NFC communications enabled devices. Examples include mobile telephones, PDAs, computers, smart cards. When comprised within such NFC communications enabled devices the NFC communicator must be able to transfer data to and from the larger device and to and from any peripheral devices (including interface systems, such as the single wire protocol) associated with such larger device.

In addition NFC communicators may be associated with or comprised within or attached to certain peripheral devices, for example SIM cards (e.g. UICC), Secure Elements, memory devices (for example MCU, RAM, ROM and non-volatile memory), display driver or other drivers. During operation the NFC communicator must also be able to communicate with and transfer data to and from such peripheral device.

There may be only one target near field RF communicator (RFID transponder or target mode NFC communicator) communicating at one time with a corresponding initiator near field RF communicator (RFID transceiver or initiator mode NFC communicator). However, there are circumstances in which it may be advantageous for two or more target near field RF communicators to derive a power supply from a supplied RF field. For example this may enable the user of an RFID transponder to select one transponder for use from multiple transponders within the same RF field.

Where a number of RFID tags are present in the H-field produced by an RFID reader the tags can be considered as a set of impedances coupled in parallel with a voltage source (which represents the reader). In such an example, if any one of the parallel coupled impedances is significantly lower than the others it will tend to draw the majority of the available current. Power varies as the square of current which means that the power drawn from the H-field by any one tag increases rapidly with its input current. Therefore, in order to share power between more than one tag, it is necessary that they each have an appreciable input impedance.

In order to protect electronic components of RFID tags from damaging voltages it is preferable to regulate the voltage to which they are exposed, for example using a shunt regulator. Generally the use of a shunt regulator means that, above a certain voltage, the apparent impedance of an RFID tag is very low. This means that the use of voltage regulators, although necessary, does not promote energy sharing between RFID tags which are present in the same H-field.

The above described problem also occurs in NFC communicators operating in "target" mode. The principles and designs described herein are applicable equally to RFID tags and NFC communicators.

An aspect of the present invention provides a near field RF communicator that alleviates at least some of the aforementioned problems.

An aspect of the present invention provides a near field RF communicator having a shunt coupled across an antenna, a voltage regulator and a regulator controller to vary the regulated voltage with shunt current.

An aspect of the present invention provides a near field RF communicator having a demodulator that extracts modulation on the basis of the current of a received modulated signal.

An aspect of the present invention provides a near field RF communicator having a modulator that effects load modulation by changing a voltage threshold of a voltage regulator.

An embodiment provides a regulation circuit comprising: a rectifier; an error amplifier coupled to the rectifier; shunt element coupled to the error amplifier and being controllable via the output from such error amplifier; and measurement means for directly or indirectly measuring shunt current; and wherein the Rs of the regulation circuit is controlled in accordance with the measurement of shunt current.

An embodiment provides a regulator for a near field RF communicator which permits energy sharing between RF devices.

The measurement means may be coupled to a reference signal. The reference signal may be scaled as a function of the output from the measurement means. The output from the measurement means may be adjusted or adjustable. The reference signal may be scaled by output from the measurement means as a function of the input current received by the regulation circuit. The measurement means may measure the current by using a resistor. The measurement means may measure gate voltage ($V_{gs}$) across the FETs within the shunt element. The output from the measurement means may be in accordance with the following formula:

$$VDDA = V_{ref} * (V_{th} + \text{sqrt}(2 * L_{shunt}/\beta))/k$$

The regulation circuit may have a series voltage drop element. The series voltage drop element may comprise an error amplifier and resistor. The voltage drop across the said resistor may be controlled by the current flowing in the resistor. The shunt element may be an AC shunt element or a DC shunt element. The output from such regulation circuit may be coupled to a demodulator.

In an embodiment, a regulator controller enables multiple target near field RF communicators comprising such a regulator controller to derive a power supply from the same supplied RF field i.e. to share the energy being supplied. In a preferred embodiment such a regulator controller provides the target near field RF communicators with an effective increased Rs value, where Rs is the effective series resistance of the regulation circuit, The near field communicator may be an RFID transponder or tag or may be an NFC communicator.

The present invention also provides a host, peripheral or other device comparing a near field RF communicator. Examples of hosts or larger devices include mobile telephones, PDAs, computers, smart cards. Examples of peripherals include SIM cards (e.g. UICC), Secure Elements, memory devices (for example MCU, RAM, ROM and non-volatile memory), display driver or other drivers In an aspect there is provided a near field RF communicator having: an inductive coupler to enable inductive coupling with a magnetic field of an RF signal; a rectifier to rectify an AC voltage derived from an RF signal inductively coupled to the inductive coupler; and a regulator to regulate a voltage derived from an RF signal inductively coupled to the inductive coupler, the regulator having a voltage-controlled impedance and a regulator controller to provide a control voltage for the voltage controlled impedance and to vary the control voltage in dependence upon a current flowing through the voltage controlled impedance.

In an embodiment there is provided a near field RF communicator wherein the regulator controller comprises a feedback element coupled to cause the control voltage to vary in dependence upon a current flowing through the voltage controlled impedance.

In an embodiment there is provided a near field RF communicator wherein the feedback element comprises an amplifier having positive and negative inputs, and an output coupled to control the control voltage of the amplifier, and a feedback device coupled between the amplifier negative input and output.

In an embodiment there is provided a near field RF communicator, wherein the feedback device comprises a voltage scaler.

In an embodiment there is provided a near field RF communicator wherein the feedback device comprises a voltage scaler to scale the control voltage on the basis of a reference voltage.

In an embodiment there is provided a near field RF communicator wherein the feedback device comprises a voltage scaler to multiply the control voltage by a reference voltage.

In an embodiment there is provided a near field RF communicator wherein the positive input of the amplifier is coupled to a junction of a potential divider coupled across the rectifier.

In an embodiment there is provided a near field RF communicator wherein the voltage controlled impedance comprises a respective voltage controlled impedance for each polarity the AC voltage.

In an embodiment there is provided a near field RF communicator wherein each voltage controlled impedance has first and second main electrodes and a control electrode to control a conduction path between the main electrodes.

In an embodiment there is provided a near field RF communicator wherein a said voltage controlled impedance comprises an insulated gate field effect transistor.

In an embodiment there is provided a near field RF communicator wherein the regulator controller is arranged to determine the current flowing through the voltage controlled impedance on the basis of a voltage between the control electrode and one of the first and second main electrodes.

In an embodiment there is provided a near field RF communicator wherein the regulator controller is arranged to determine the current flowing through the voltage controlled impedance on the basis of a voltage across a resistance coupled in series with the voltage controlled impedance.

In an embodiment there is provided a near field RF communicator wherein the regulator controller is arranged to determine the current flowing through the voltage controlled impedance on the basis of a current mirror that is coupled to mirror the current flowing through the voltage controlled impedance.

In an embodiment there is provided a near field RF communicator wherein the regulator is coupled to regulate an AC voltage derived from an RF signal inductively coupled to the inductive coupler.

In an embodiment there is provided a near field RF communicator wherein the regulator is coupled to regulate a DC output of the rectifier.

In an embodiment there is provided a near field RF communicator wherein a current extractor is coupled to the output of the rectifier to extract a portion of the rectified current and wherein a demodulator of the near field RF communicator is arranged to extract modulation from the extracted portion.

In an embodiment there is provided a near field RF communicator wherein the current extractor is arranged to extract a portion that does not vary significantly with the rectified voltage provided by the rectifier.

In an embodiment there is provided a near field RF communicator wherein the portion is a substantially constant proportion of the rectified current.

In an embodiment there is provided a near field RF communicator wherein the portion is proportional to the rectified current.

In an embodiment there is provided a near field RF communicator wherein the current extractor has a first current path coupled between the rectifier and a first output of the current extractor and a second current path coupled between the rectifier and a second output of the current extractor, the first output being coupled to the demodulator and the second output being coupled to provide power to the communicator.

In an embodiment there is provided a near field RF communicator, wherein first and second paths include voltage controlled impedances.

In an embodiment there is provided a near field RF communicator wherein the current extractor has a voltage stabilizer to control the voltage across the voltage controlled impedance of the second current path.

In an embodiment there is provided a near field RF communicator wherein the voltage stabilizer comprises an amplifier having a first amplifier input coupled to the second output of the current extractor, a second amplifier input coupled to a controlled voltage and an amplifier output coupled to the control electrodes of the voltage controlled impedances of the first and second current paths.

In an embodiment there is provided a near field RF communicator, wherein the controlled voltage is provided by a reference current provider and a resistance.

In an embodiment there is provided a near field RF communicator wherein the current extractor has a further voltage stabilizer to control the voltage across the voltage controlled impedance of the first current path to match the voltage across the voltage controlled impedance of the second current path without drawing significant current from the second current path.

In an embodiment there is provided a near field RF communicator wherein the further voltage stabilizer comprises an amplifier having a first amplifier input coupled to the second output of the current extractor, a second amplifier input coupled to the rectifier output via the first current path and an amplifier output coupled to the control electrode of a further voltage controlled impedance.

In an embodiment there is provided a near field RF communicator wherein the further voltage controlled impedance provides a current path between the demodulator input and the voltage controlled impedance of the first current path.

In an embodiment there is provided a near field RF communicator further comprising a modulator to modulate an RF signal inductively coupled to the inductive coupler, the modulator being coupled to modulate the regulator control voltage in accordance with the data to be communicated.

In an aspect there is provided a near field RF communicator having: an inductive coupler to enable inductive coupling with a magnetic field of an RF signal; a rectifier to rectify an AC voltage derived from an RF signal inductively coupled to the inductive coupler; a regulator to regulate a voltage derived from an RF signal inductively coupled to the inductive coupler, the regulator having a voltage-controlled impedance; and a modulator to provide a voltage control signal to cause the impedance of the voltage-controlled impedance to vary to modulate the load on the inductive coupler in accordance with data to be communicated.

In an embodiment there is provided a near field RF communicator, further comprising an adder to add a reference voltage to an output of the modulator.

In an aspect there is provided a near field RF communicator having a demodulator that extracts modulation on the basis of the current of a received modulated signal.

In an aspect there is provided a near field RF communicator having a modulator that effects load modulation by changing a voltage threshold of a voltage regulator.

In an aspect there is provided a near field RF communicator having a shunt coupled across an antenna, a voltage regulator and a regulator controller to vary the regulated voltage with shunt current.

In an aspect there is provided a regulation circuit for a near field RF communicator comprising: a rectifier; an error amplifier coupled to the rectifier;
a shunt element coupled to the error amplifier and being controllable via the output from such error amplifier; and measurement means for directly or indirectly measuring shunt current; and
wherein the Rs, the effective series resistance of the regulation circuit, is controlled in accordance with the measurement of shunt current.

In further aspects and embodiments there is provided a regulator.

In an aspect there is provided a near field RF communicator wherein the near field RF communicator is an NFC communicator or RFID tag.

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collection(s) of integrated circuits.

Figure 1:
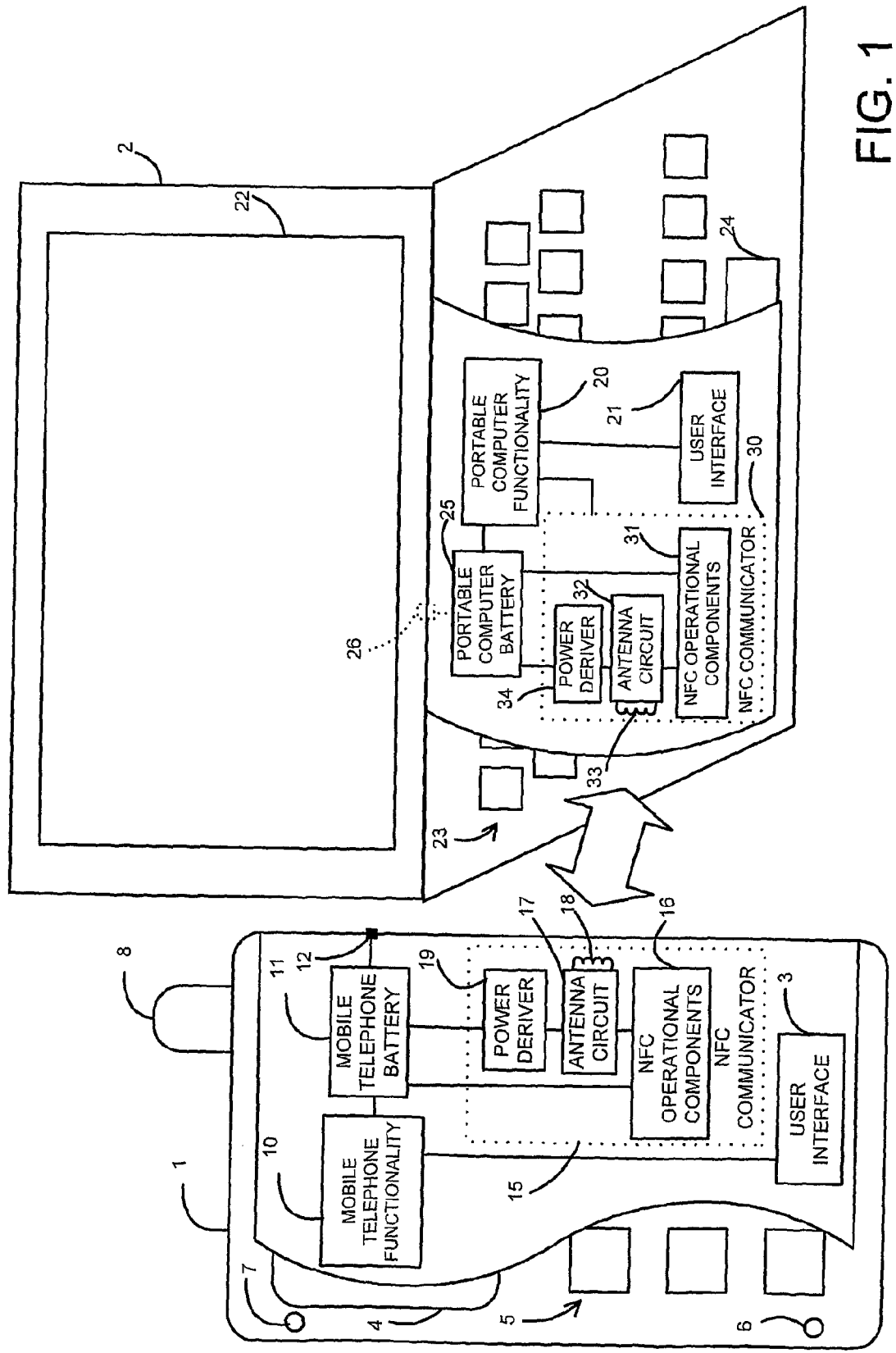
FIG. 1 shows a representational diagram illustrating communication between two devices comprising NFC communicators.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIMcard), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery. The chargeable battery 11 forms the primary power supply for the mobile telephone and NFC communicator 15. Given it is chargeable, it is designed to be removed at certain times.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25. Again the chargeable battery 25 is the primary power supply for the portable computer and NFC communicator 30.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an antenna circuit 17 and 32 comprising an inductor or coil in the form of an antenna 18 and 33. The antenna circuits 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. In this case as shown by dashed lines in FIG. 1, one or both of the power providers 19 and 34 comprise a coupling to derive power from the corresponding device battery 11 or 25 i.e. the primary power supply.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

As another possibility the NFC communicator (15 or 30) may be comprised within or coupled to a peripheral device, for example in the form of a smart card or other secure element which may be stand alone or comprised within or intended to be inserted into another electrical device. For example a SIM card for use in a mobile telephone. As a further possibility such peripheral devices may comprise interfacing systems or protocols such as the single wire protocol.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
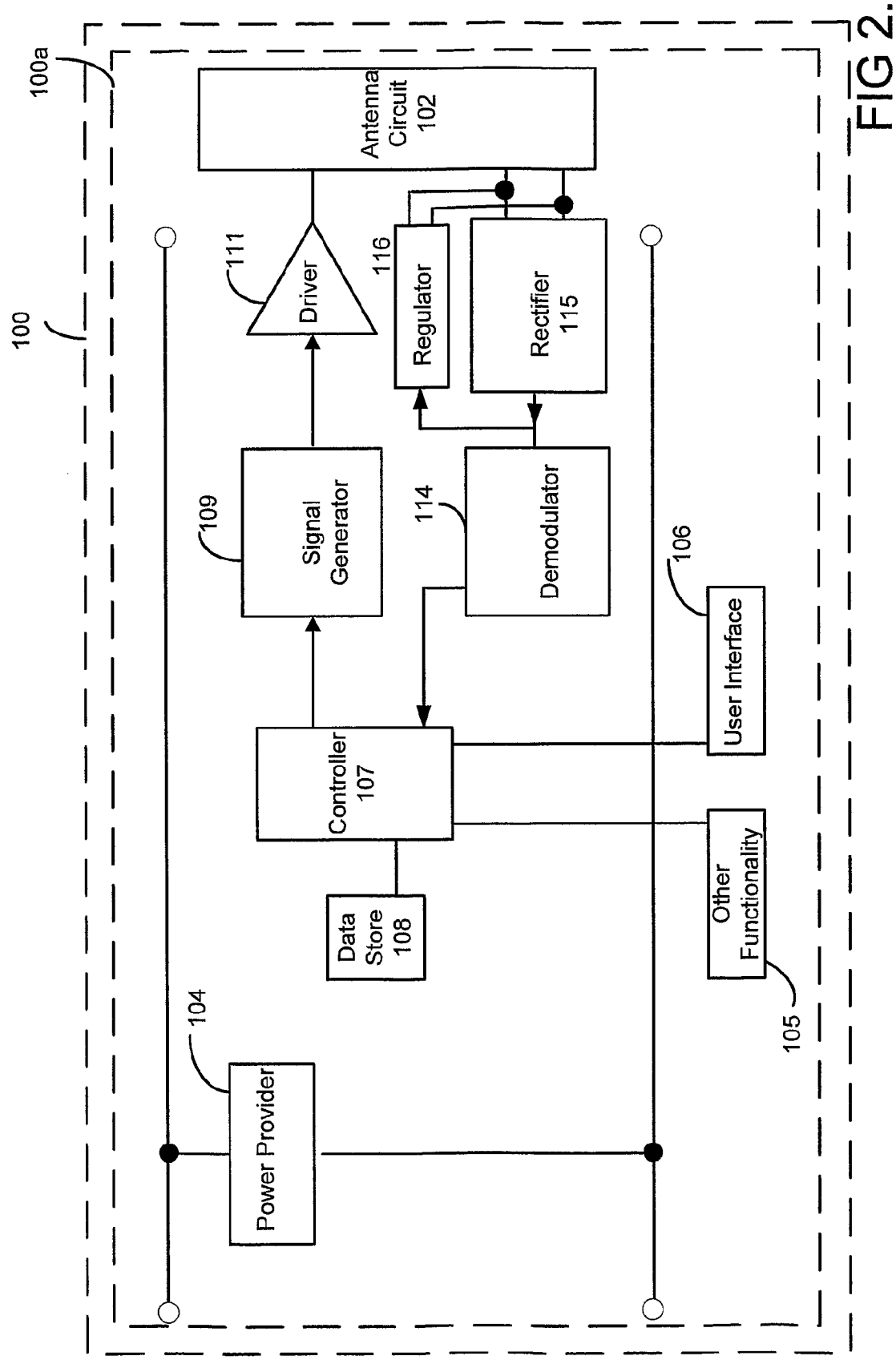
FIG. 2 shows an embodiment of an NFC communicator that may embody the present invention.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 100a having NFC operational components including an antenna circuit 102, power provider 104, controller 107, data store 108, signal generator 109 and demodulator 114.

The power provider 104 may be any one or more of the types of power providers discussed above. In the interests of simplicity, power supply couplings from the power provider 104 to other components are not shown in FIG. 2.

The NFC communications enabled device 100 may or may not also have or be capable of being connected or coupled with at least one of other functionality 105 (for example functionality of a host device or peripheral device such as described above) and a user interface 106.

The NFC operational components include a demodulator 114 coupled between the antenna circuit 102 and the controller 107 for demodulating a modulated RF signal inductively coupled to the antenna circuit 102 from another near field RF communicator in near field range and for supplying the thus extracted data to the controller 107 for processing. The received signal is first past through a rectifier 115 and regulator 116. The regulator 116 sets the required pin voltage and rectifier 115 provides rectified voltage to remainder of NFC circuit. Together the rectifier 115 and regulator 116 protect the NFC operational components from high voltages received at antenna circuit 102. For example the regulator may limit the voltage to 3.3 volts. Any standard regulator and rectification circuit can be used for this. The NFC operational components may also include an amplifier for amplifying an RF signal inductively coupled to the antenna circuit 102.

In addition the NFC operational components include components for enabling modulation of an RF signal to enable data to be communicated to another near field RF communicator in near field range of the NFC communicator 100a. As shown in FIG. 2, these components comprise a signal generator 109 coupled via a driver 111 to the antenna circuit 102. In this example, the signal generator 110 causes modulation by gating or switching on and off the RF signal in accordance with the data to be communicated. The NFC communicator may use any appropriate modulation scheme that is in accordance with the standards and/or protocols under which the NFC communicator operates. As another possibility a separate or further signal controller may be incorporated within the NFC operational components to control modulation of the signal generated by the signal generator 109 in accordance with data or instructions received from the controller 107.

The NFC operational components also include a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC communicator 100a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. NFC communicators commonly operate at or around 13.56 MHz.

When in initiator or target mode, the NFC communicator may communicate in accordance with an active or passive protocol. When using an active protocol the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

In FIG. 2 control of operation of the NFC communicator is through controller 107. As another possibility where the NFC communicator is comprised as part of a host device, control of the operation of the NFC communicator may be directed by the host device, for example through other functionality 105. In such circumstances all or part of the control may be provided by other functionality 105. For example the NFC communicator controller 107 may control modulation and modulation protocols whereas the data to be transmitted may be provided by other functionality 105. FIG. 2 shows a signal generator 109 and a driver 111 coupled directly to antenna circuit 102, as will be appreciated other configurations are possible, for example indirect driving of the antenna circuit 102.

The NFC communicator also comprises an antenna circuit 102. The design of the antenna circuit will depend on the NFC communicator 100 and the environment in which it operates. For example the antenna circuit may be in the form described for co-pending international patent application number publication number WO2008/117029, application number PCT/GB2008/000992 (which claims priority from GB 0705635.1).

The NFC communicators described above, have a power provider. They may also be able to derive a power supply from an RF signal inductively coupled to the antenna circuit 102 (FIG. 2). Passive (i.e not self-powered) RFID tags will not have a power provider but will derive a power supply from an RF signal inductively coupled to their antenna.

Figure 3:
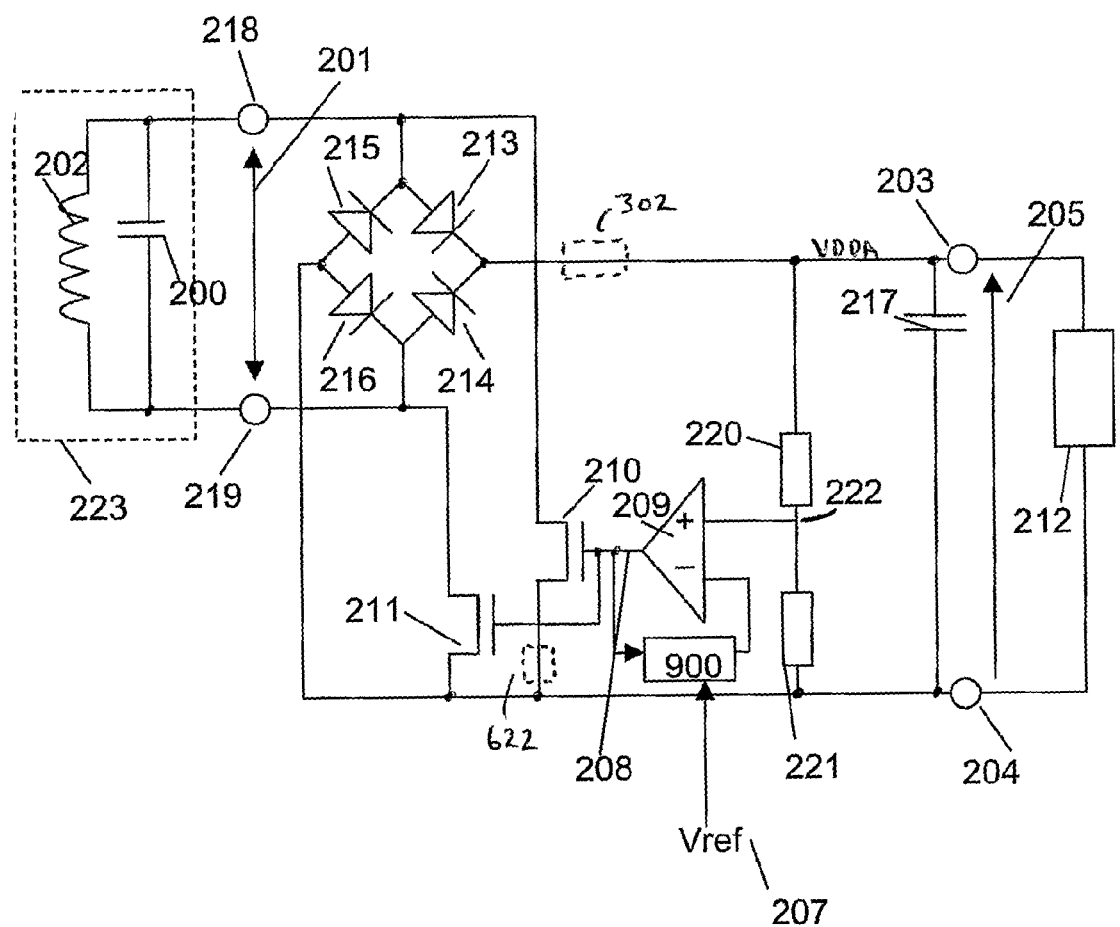
FIG. 3 shows a part functional, part circuit diagram of a near field RF transponder or tag embodying the invention.

FIG. 3 shows a functional circuit diagram of an RFID tag according to an example of the invention. In this example an inductive coupler 223 includes inductor 202 and capacitor 200 connected in parallel between nodes 218 and 219.

Diodes 213, 214, 215 and 216 are coupled to form a bridge rectifier. Diodes 215 and 213 are coupled to provide a forward conduction path between node 204 and node 203. Node 218 is coupled to the connection between diodes 215 and 213. Diodes 216 and 214 are coupled to provide a second forward conduction path between node 204 and node 203. Node 219 is coupled to the connection between diodes 216 and 214.

Shunt impedances 210 and 211 are provided by voltage controlled impedances each having first and second main electrodes and at least one control electrode.

The first main electrode of shunt impedance 210 is coupled to node 204, the second main electrode of shunt impedance 210 is coupled to node 218. The first main electrode of shunt impedance 211 is coupled to node 204, generally a ground connection 204, the second main electrode of shunt impedance 211 is coupled to node 219. The control electrodes of 210 and 211 are both coupled to the output of amplifier 209.

Resistor 221 is coupled between node 204 and node 222, and resistor 220 is coupled between node 203 and node 222. Node 222 is coupled to the non-inverting input of amplifier 209.

A voltage scaler 900 is coupled to the output of amplifier 209 and to a reference voltage $V_{ref}$ and to the inverting input of amplifier 209. One electrode of capacitor 217 is coupled to node 203 and the other electrode of capacitor 217 is coupled to node 204.

Communicator functionality 212, for example RFID or NFC functionality, in this example RFID tag functionality, is coupled between node 203 and node 204.

Resistors 220 and 221 form a potential divider between terminals 203 and 204 such that the voltage at node 222 is a fraction, k, of the voltage, VDDA, at node 203. Diodes 213, 214, 215 and 216 are connected to form a rectifier. If the voltage at node 218 is sufficiently high then diodes 213 and 216 become conducting and, if the voltage at node 219 is sufficiently high diodes 214 and 215 become conducting.

The voltage scaler 900 derives a measure of the shunt current $I_d$ (the current between the first and second main electrodes of shunt impedances 210 and 211) from the voltage, $V_{gs}$ at the control electrodes of 210 and 211. In this example, shunt impedances 210 and 211 are provided by FET transistors so $V_{gs}$ is related to the current $I_d$ between the first and second main electrodes by the relationship:

$$V_{gs} = \sqrt{\frac{2I_d}{\beta}} + V_t, \tag{1}$$

where $\beta$ is related to the transconductance and $V_t$ is the threshold voltage of the FET.

In this example voltage scaler 900 multiplies the reference voltage $V_{ref}$ by $V_{gs}$. Voltage scaler 900 provides the product, $V_{gs}V_{ref}$ to the inverting input of amplifier 209. Amplifier 209 regulates the shunt current such that, in this example, $$VDDA = \frac{V_{ref}}{k}\left(\sqrt{\frac{2I_d}{\beta}} + V_t\right).  \quad (2)$$

Controlling shunt current in this way means that the voltage developed across 218 and 219 (one diode-drop above the voltage VDDA) increases monotonically with the input current, even when the shunt impedances 210 and 211 are regulating the received voltage. In other words, tags according to this example have a current-voltage characteristic which is more suitable for energy sharing than comparable standard devices which have regulating functionality.

By selection of appropriate component values the form of this current-voltage characteristic can be chosen according to the specific application and the range of input currents to which the device is likely to be exposed, for example at the maximum input current the voltage VDDA is regulated to be less than a predetermined level.

Transconductance, $\beta$, and threshold voltage, $V_t$, are process and temperature dependent quantities, which can cause the circuit to exhibit complex environment-sensitive behaviour. In one possibility shunt current can be measured directly, for example by using the voltage across resistor 622 (shown in dashed lines in FIG. 3) rather than $V_{gs}$. This reduces the sensitivity to environmental conditions because the only environment sensitive parameter in this instance is the resistivity of the resistor. As will be appreciated, in this possibility an additional resistor may be coupled in series between shunt impedance 211 and node 204.

In another possibility a current mirror may be used to sink a current through resistor 220, thereby modifying the voltage at an input of amplifier 209. In this possibility the current sink is controlled with reference to the shunt current.

As described above with reference to FIG. 3, RFID tags generally include voltage regulator 209, 210, 211, 220, 221, 900, an energy storage capacitor 217 and a demodulator (included in communication functionality 212) for demodulating data from a received H-field.

When the regulator is regulating the received voltage, the shunt current, and hence the voltage, $V_{gs}$, at the control electrodes of shunt elements 210 and 211, will reflect any received modulation. This means that a demodulator (not shown) can derive a modulation signal from the voltage $V_{gs}$. In low H-fields, when the regulator is not regulating, shunt elements 210 and 211 will be switched off and therefore it is not possible to measure received modulation by measuring the shunt current. In this instance, modulation may be measured directly by measuring the rectified signal, VDDA. However, amplitude modulation of the received signal causes a reduction in the average rectified voltage, which may result in a downward drift in VDDA. In addition, capacitor 217 tends to smooth out any steps in the modulation signal. These effects reduce the effective signal to noise ratio of the modulation signal.

Figure 4:
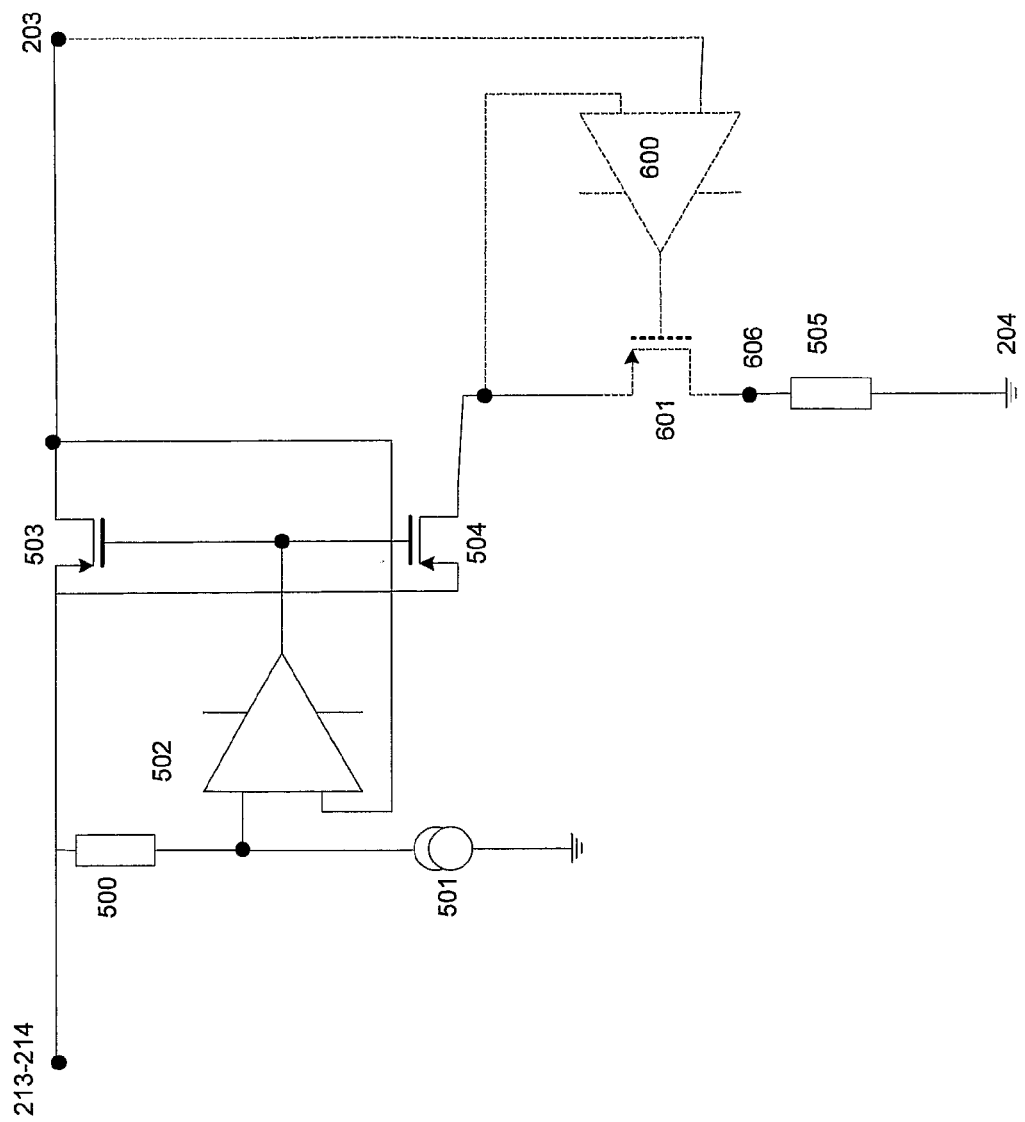
FIG. 4 shows a circuit diagram to illustrate a modification that may be made to a regulator of the near field RF transponder or tag shown in FIG. 3.

FIG. 4 shows an active series voltage drop element 302 (shown in dashed lines in FIG. 3) which, in one possibility, is connected between the rectifier cathode 213-214 and node 203 (FIG. 3). This at least partially mitigates the above described signal to noise ratio problem by enabling demodulation of the rectified input current.

This provides the advantage that, when the regulator is not regulating, the demodulator will receive a better signal and the demodulation characteristics of the device will be improved. When regulating, this circuit may also be used to control the current-voltage characteristic of the circuit.

In the example of FIG. 4 the first terminal of resistor 500 is connected to current source 501 and the second terminal of resistor 500 is coupled to rectifier cathode, 213-214.

The first main electrode of voltage controlled impedance 503 is coupled to rectifier cathode 213-214 and to the first main electrode of voltage controlled impedance 504. The control electrodes of voltage controlled impedances 503 and 504 are coupled to the output of amplifier 502. The non-inverting input of amplifier 502 is coupled to the second main electrode of voltage controlled impedance 503 and to node 203 (FIG. 3). The inverting input of amplifier 502 is coupled to the first terminal of the resistor 500.

In another possibility, amplifier 600 and voltage controlled impedance 601 (shown in dashed lines) are included. The second main electrode of voltage controlled impedance 503 is coupled to the non-inverting input of amplifier 600. The first main electrode of voltage controlled impedance 601 is coupled to the second main electrode of voltage controlled impedance 504 and to the inverting input of amplifier 600.

The first terminal of resistor 505 is coupled to the second main electrode of voltage controlled impedance 504. The second terminal of resistor 505 is coupled to a reference voltage, for example to node 204.

Current source 501 and resistor 500 hold the voltage at the inverting input of amplifier 502 at a predetermined voltage. Amplifier 502 operates to maintain the voltage across the first and second main electrodes voltage controlled impedance 503 at this predetermined level. This configuration ensures that voltage controlled impedances 503 and 504 operate in a manner in which the current between their first and second main electrodes is weakly dependent upon the voltage at the second main electrode and controlled primarily by the voltage between the first electrode and the control electrode.

In the example of FIG. 4 voltage controlled impedances 503 and 504 are PMOS transistors and the operation of amplifier 502, current source 501 and resistor 500 ensures that the drain-source voltage of 503 is maintained at a predetermined voltage level. In this example transistor 503 is designed so that at the maximum operating current the voltage difference between the drain and source electrodes of PMOS transistor 503 is not greater than this predetermined voltage level.

Amplifier 600 and voltage controlled impedance 601 operate to regulate the voltage at the second main electrode of voltage controlled impedance 504. This ensures that the voltage across the first and second main electrodes of voltage controlled impedance 504 is identical to the voltage across the first and second main electrodes of voltage controlled impedance 503. This configuration enables the current through voltage controlled impedance 504 accurately to follow the current through voltage controlled impedance 503.

Any modulation of the received H-field will be apparent in the voltage at node 606 and, because this voltage is dependent on the input current not the voltage VDDA, the smoothing and voltage drift effects of capacitor 217 (FIG. 3) will not affect the apparent modulation. In other words, voltage drift effects are mitigated by demodulating the input current rather than the rectified voltage.

In the example of FIG. 4, 503 and 504 have been shown as single FETs. As will be appreciated, in practice either or both may be replaced with multiple FETs to provide scaling of the current provided to resistor 505 and NFC functionality 212.

Figure 5:
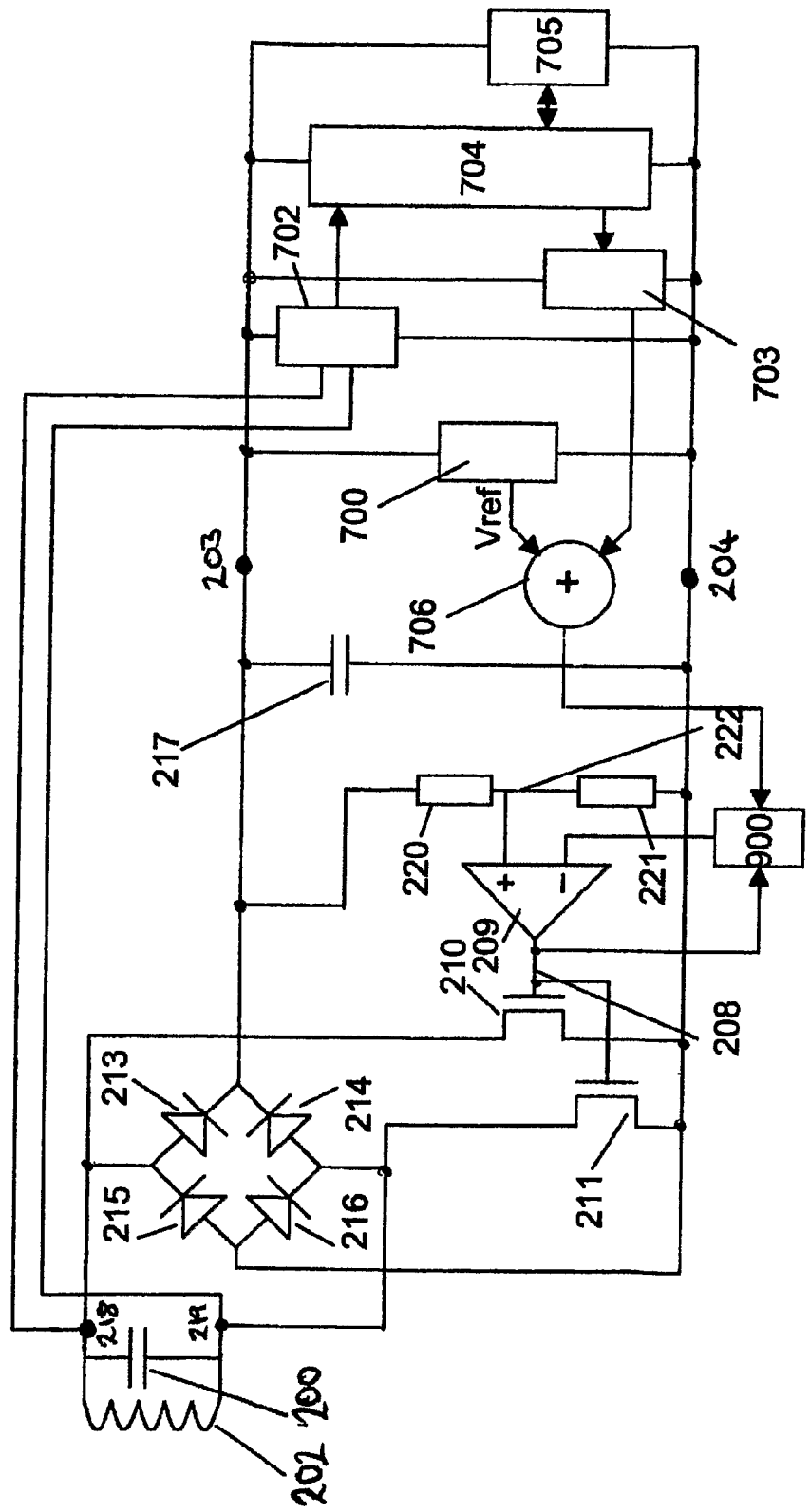
FIG. 5 shows a part functional part circuit diagram of another example of a near field RF transponder or tag embodying the invention.

FIG. 5 shows an RFID tag according to an example of the invention which follows closely the design of FIG. 3 which is described above. Reference numerals used in FIG. 3 have the same meaning when used in FIG. 5. FIG. 5 shows components of the communicator functionality 212 as shown in FIG. 3.

In particular, as shown in FIG. 5, communicator functionality 212 (FIG. 3) comprises reference voltage provider 700, demodulator 702, modulator 703, controller 704, and memory 705. Each of these components is coupled in parallel with capacitor 217 across nodes 203 and 204, as the communicator functionality 212 shown in FIG. 3.

Voltage adder 706 is coupled to an output of reference voltage provider 700 and to an output of modulator 703. An output of voltage adder 706 is coupled to voltage scaler 900.

An output of controller 704 is coupled to an input of modulator means 703. An input/output terminal of controller 704 is coupled to an input/output terminal of memory 705.

In the example of FIG. 4 demodulator means 702 has two inputs one of which is coupled to node 218 and the other is coupled to node 219. An output of demodulator 702 is coupled to an input of controller 704.

Modulator 703 is controlled by controller 704 to output a modulated voltage signal. Voltage adder 706 sums the modulated voltage signal with a reference voltage provided by 700. The summed voltages are then scaled by voltage scaler 900 as described above (for example by multiplying the summed voltages by a function of the shunt current).

The impedance of shunt elements 210 and 211 is thus controlled to provide a controlled current-voltage characteristic as described above and, when the modulation means is providing a modulated voltage signal, the impedance of shunt elements 210 and 211 is controlled is accordance with the modulated voltage signal. This modulates the resistive load on inductive coupler 223. This provides load modulation of signals inductively coupled by the inductive coupler 223.

These changes in impedance modulate coupling to the transceiver generating the received H-field 405.

The transponder functionality of FIG. 5 is able to carry out signalling to a transceiver at high data rates by using output voltage modulation. In addition, performing AC side regulation and controlling a shunt regulator to provide load modulation means that fewer components are required and lower area is occupied by examples of the invention than by designs which require separate modulating and regulating components. This provides advantages where examples of the invention are integrated as components of larger semiconductor architectures, for example in mobile phones or computing devices.

As an example, for example if the circuit is an integrated circuit, $V_{ref}$ may for example be produced from a band gap voltage reference providing a stable reference voltage, for example 1.25V.

In one example approximate values of the components shown are as follows: the capacitor 217 has a capacitance of 100 pF; the load 212 has a resistance of 70 kΩ; and the resistors 220 and 221 have a total resistance of 100 kΩ.

Such values are given for example only and it should be clear to one of ordinary skill in the art that they can and should be varied depending on operational constraints.

It will be apparent to one of ordinary skill in the art that the scaling factor and concepts described in relation to FIGS. 3 to 5 may be applied to other regulation circuits, for example to the regulation circuit described in WO 2006/003460.

It will be appreciated that the load modulation technique described above with reference to FIG. 5 may be used without the voltage scaler shown in FIG. 3.

In the examples provided capacitances have been indicated by discrete capacitor components, as will be appreciated capacitors may be provided by discrete components or may be inherent in features of circuit design.

In the examples shown rectifiers comprise diodes. Where it is appropriate, alternate or additional rectifiers may be used, for example half wave and/or actively switched rectifiers.

Throughout the examples provided single FETs may be replaced by appropriate configurations comprising multiple FETs. As will be understood by the skilled practitioner any appropriate gate controlled impedance may be used in place of the depicted NMOS and PMOS transistors. For example, where NMOS or PMOS transistors have been shown these may be replaced by appropriate configurations of different insulated gate FETs, bipolar transistors or other suitable gate controlled impedance components.

As will be appreciated by the skilled practitioner the term threshold voltage refers to the voltage required to form a conduction channel in a MOS transistor and the actual voltage will vary depending on operational and geometric constraints. In other examples the term threshold voltage should be understood to mean the voltage required to switch on any voltage controlled impedance. In addition, it may be possible to use bipolar transistors, where bipolar transistors are used the threshold voltage should be understood to mean the switch on voltage of the bipolar transistor, for example 0.7 Volts.

In above embodiments described with reference to FIGS. 3 to 5, the near field RF communicator is an RFID tag. The present invention may be applied to NFC communicators, for example the regulator 116 shown in FIG. 2 may have the functionality described above with respect to FIG. 3 or 4. The functionality shown in FIG. 5 may be applied in the case of an NFC communicator where that communicator has the capability to load modulate a signal inductively coupled to its antenna in place of or in addition to the capability shown in FIG. 2 to generate and modulate its own RF signal.

As described above, the regulator is an AC shunt regulator. AC shunting is preferred because DC shunting tends to have a significant rectifier diode voltage drop and large supply ripple at high input currents. However the present invention may be applied where the regulator is a DC shunt regulator.

The scaling factor obtained by the direct or indirect measurement of shunt current may be adjusted by the regulation circuit depending on the desired characteristics of the circuit. In the example given above scaling is of Vref. As an alternative scaling may be achieved by adjusting the ratio of resistors 220 and 221 as a function of current. Although the foregoing examples discuss the use of FETs (field effect transistors), it will be apparent that any other transistor type such as bipolar transistors, or any other known switching means or controllable device can be used to provide similar effect.

It will be apparent that diodes in the foregoing discussion could be constructed from any of the known methods, such as for example FETs used as a rectifier, or the type known as PN diodes.

Wherever a rectifier is shown as a full-wave rectifier, it will be apparent that other rectification methods could be used individually or in any combination. Other rectifying methods may involve half-wave rectifiers or other rectification means such as voltage multipliers.

As with the regulation circuit itself, the apparatus shown in FIG. 5 may use any rectification circuit. In addition and advantageously the regulation circuit may use the circuit in FIG. 4.

An apparatus using a regulator according to the present invention need not comprise all the functionality of a transponder. An apparatus using a regulator according to the present invention may also be in standalone form (either hand held or free standing) or disposed within a larger device or host device/system, for example a mobile communications device, a PDA, a personal computer, a laptop, a game console, a vending machine, a digital music player etc. Such apparatus or devices may comprise an integrated circuit or alternatively the functions of the apparatus may be performed by separate component parts or separate integrated circuits. Where a regulator is provided within a larger device the functions may be shared between the transponder and the larger device, for example the transponder may not have a memory but may use a memory means provided within the larger device. It will be apparent that other systems, devices and methods can be advantageously designed to use the present invention.

An apparatus using a regulator according to the present invention may communicate with a transceiver. Such a transceiver can be in standalone form (either hand held or free standing) or disposed within a larger device, host device or system, for example a mobile or fixed communications device or system, computer, ticket inspection machine, transport access mechanism or gate etc.

An apparatus using a regulation circuit according to the present invention may, for example also be an NFC device or communicator. Such NFC device or communicator may be fully or partly comprised within a larger device or host system. It may also be removable from such larger device or host system.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field communications (NFC) device, comprising:
   a rectifier configured to rectify an induced power to provide a rectified power;
   a voltage-controlled impedance configured to adjust an induced current flowing through the voltage-controlled impedance, in response to a control signal, to regulate the rectified power;
   a regulator controller configured to provide the control signal based on a feedback signal; and
   a feedback device configured to multiply the control signal by a reference voltage to generate the feedback signal.

2. The NFC device of claim 1, wherein the regulator controller comprises:
   an amplifier, having non-inverting and inverting inputs and an output, configured to provide the control signal, wherein the feedback device is coupled between the inverting input and the output.

3. The NFC device of claim 2, wherein the non-inverting input is coupled to a voltage divider, the voltage divider being coupled to the rectifier.

4. The NFC device of claim 2, wherein the induced power includes an alternating current (AC) voltage, and wherein the voltage-controlled impedance comprises:
   a first and a second voltage-controlled impedance corresponding to each polarity of the AC voltage.

5. The NFC device of claim 1, wherein the regulator controller is further configured to adjust the induced current based on a voltage between a control electrode and a main electrode of the voltage-controlled impedance.

6. The NFC device of claim 1, wherein the regulator controller is further configured to determine the induced current based on a voltage across a resistance coupled in series with the voltage-controlled impedance.

7. The NFC device of claim 1, further comprising:
   a current mirror configured to mirror the induced current to provide a mirrored current, and
   wherein the regulator controller is further configured to determine the induced current based on the mirrored current.

8. The NFC device of claim 1, further comprising:
   a current extractor configured to extract a portion of the rectified power to provide an extracted portion of a rectified current; and
   a demodulator configured to extract data from the extracted portion.

9. The NFC device of claim 8, wherein the current extractor is further configured to substantially maintain the extracted portion of the rectified current at a constant level with variations in the rectified voltage.

10. The NFC device of claim 8, wherein the current extractor is further configured to provide the extracted portion that is proportional to the rectified current.

11. The NFC device of claim 8, wherein the current extractor further comprises:
    a first current path coupled between the rectifier and a first output of the current extractor; and
    a second current path coupled between the rectifier and a second output of the current extractor, wherein the first output is coupled to the demodulator, and wherein the second output is configured to provide power to the NFC device.

12. The NFC device of claim 11, wherein the first current path and the second current path include a second and a third voltage-controlled impedance, respectively, and wherein the current extractor further comprises:
    a voltage stabilizer configured to control a voltage across the second voltage-controlled impedance.

13. The NFC device of claim 12, wherein the current extractor further comprises:
    a second voltage stabilizer configured to control a voltage across the second voltage-controlled impedance to substantially match a voltage across the third voltage-controlled impedance.

14. A near field communications (NFC) device, comprising:
    a rectifier configured to rectify an induced power and to provide a rectified voltage and a rectified current;
    a first voltage-controlled impedance module coupled to the rectifier; and
    a second voltage-controlled impedance module coupled to the first voltage-controlled impedance module, the first voltage-controlled impedance module being configured to substantially maintain a proportionality between the rectified voltage and a voltage input to the second voltage-controlled impedance module, the second voltage-controlled impedance module being configured to produce a demodulation signal substantially proportional to the rectified current.

15. A near field communications (NFC) device, comprising:
    a rectifier configured to rectify an induced voltage and an induced current to provide a rectified voltage and a rectified current;
    a voltage-controlled impedance configured to adjust the induced current in response to a control signal to regulate the rectified voltage;

a regulator controller configured to generate the control signal using a feedback signal;
a feedback module configured to adjust the control signal in response to a scaling signal to generate the feedback signal; and
a voltage adder configured to generate the scaling signal based on a sum of a modulated signal and a reference signal.

16. The NFC device of claim 14, further comprising:
a demodulator configured to extract data from the demodulation signal.

17. The NFC device of claim 14, wherein the first voltage-controlled impedance module comprises:
a first and a second voltage-controlled impedance, wherein a first electrode of the first and the second voltage-controlled impedance is coupled to an output of the rectifier to receive the rectified voltage, wherein a second electrode of the first voltage-controlled impedance provides power to the NFC device, and wherein a second electrode of the second voltage-controlled impedance provides the voltage input to the second voltage-controlled impedance module.

18. The NFC device of claim 14, wherein the second voltage-controlled impedance module comprises:
a first and a second electrode, wherein the first electrode is configured to receive the voltage input to the second voltage-controlled impedance module and to provide the demodulation signal at the second electrode.

19. The NFC device of claim 15, wherein the regulator controller is further configured to determine the induced current based on a voltage between a control electrode and a main electrode of the voltage-controlled impedance.

20. The NFC device of claim 15, wherein the regulator controller is further configured to determine the induced current based on a voltage across a resistance coupled in series with the voltage-controlled impedance.

* * * * *

UNITED STATES PATENT AND TRADEMARK OFFICE
CERTIFICATE OF CORRECTION

PATENT NO. : 8,588,682 B2  Page 1 of 1
APPLICATION NO. : 12/743208
DATED : November 19, 2013
INVENTOR(S) : Robin Wilson It is certified that error appears in the above-identified patent and that said Letters Patent is hereby corrected as shown below:

In the Claims

Column 16, Line 47 please replace "induced power and to" with --induced power to--.

Signed and Sealed this
First Day of July, 2014

Michelle K. Lee
*Deputy Director of the United States Patent and Trademark Office*